United States Patent [19]

Denaual

[11] 3,896,290

[45] July 22, 1975

[54] ELECTRONIC CALCULATOR
[75] Inventor: Roger Denaual, Tokyo, Japan
[73] Assignee: Establissement Teltest R.D., Vaduz, Liechtenstein
[22] Filed: Jan. 30, 1974
[21] Appl. No.: 437,991

[30] Foreign Application Priority Data
Jan. 12, 1973 France .............................. 73.01076

[52] U.S. Cl. ...................... 235/61.7 R; 235/61.7 R
[51] Int. Cl. ............................................. G06k 7/00
[58] Field of Search ...... 235/61.7 R, 61.7 B, 61.7 A

[56] References Cited
UNITED STATES PATENTS
3,792,235   2/1974   Durante et al. ................ 235/61.7 R Primary Examiner—Vincent P. Canney
Attorney, Agent, or Firm—Oblon, Fisher, Spivak, McClelland & Maier

[57] ABSTRACT

An electronic calculator for authenticating messages between financial institutions, e.g. banks, by utilizing a coded test number transmitted with the message. The calculator includes a set of memory codes to provide a numeral indicative of the message and a totalizer for the numerals in the code. The calculator enables the test numeral to be deciphered, either when sending or receiving, in an automatic fashion from programmed cards which may be made, checked, corrected or copied using the same machine.

1 Claim, 4 Drawing Figures

ELECTRONIC CALCULATOR

BACKGROUND OF THE INVENTION

1. Field of the Invention

The present invention is related to an electronic calculator for authenticating telegraphic messages exchanged between organizations which deal with money.

2. Description of the Prior Art

Beween bodies engaging in financial dealings, and particularly between banks, it is nowadays standard practice to transmit telegraphic instructions, although their genuineness can only be verified by a confirming letter or by a special coding system, the decoding of which makes it necessary for an employee who has been sworn to secrecy and who usually occupies a high position in the company hierarchy to spend a considerable time in verification and decoding.

For some years now it has been normal practice for the coding system to comprise a test number which is generated from a telegraphic cipher-key for each telegraph or telex message. The cipher-key comprises a code system for dates, currencies, amounts and usually includes a fixed serial number the value of which changes from one message to the next. Each branch of the bank would have a telegraphic cipher-key for each of the other branches of the same bank or for other banks with which they normally have dealings Table 1 below is an example of a code that may be used for such coding between a Bank A situated in Paris and a Bank B situated in Tokyo.

TABLE 1

| Day of Week | Code |
|---|---|
| Monday | 10 |
| Tuesday | 2 |
| Wednesday | 27 |
| Thursday | 58 |
| Friday | 42 |
| Saturday | 74 |
| Sunday | 90 |

| Date | Code |
|---|---|
| 1 | 113 |
| 2 | 75 |
| 3 | 15 |
| 4 | 43 |
| 5 | 59 |
| 6 | 107 |
| 7 | 20 |
| 8 | 131 |
| 9 | 91 |
| 10 | 28 |
| 11 | 21 |
| 12 | 3 |
| 13 | 29 |
| 14 | 92 |
| 15 | 130 |
| 16 | 60 |
| 17 | 114 |
| 18 | 76 |
| 19 | 108 |
| 20 | 44 |
| 21 | 61 |
| 22 | 45 |
| 23 | 109 |
| 24 | 115 |
| 25 | 77 |
| 26 | 147 |
| 27 | 154 |
| 28 | 93 |
| 29 | 6 |
| 30 | 132 |
| 31 | 11 |

| Month | Code |
|---|---|
| January | 116 |
| February | 30 |
| March | 78 |
| April | 133 |
| May | 14 |
| June | 94 |
| July | 110 |
| August | 62 |
| September | 5 |
| October | 46 |
| November | 148 |
| December | 22 |

CURRENCY

| | | | |
|---|---|---|---|
| US $ | | Swiss franc | 153 |
| Canadian $ | | Deutschmark | 163 |
| British Pound | 117 | Guilder | 1 |
| French Franc | 155 | Lire | 134 |
| Belgian franc | 53 | Swedish Kr. | 167 |
| Other currencies | | 200 | |
| Danish Kr | 95 | Australian $ | 169 |
| Norwegian Kr | 160 | Singapore $ | 23 |
| Yen | 79 | CFP Francs | 31 |
| Hong Kong $ | 168 | CFA Francs | 165 |
| Malayan $ | 111 | Djibouti Francs | 149 |
| No amount | 170 | | |

AMOUNT

| | 0, | 0 | 0 | 0, | 0 | O | 0, | 0 | 0 | 0 |
|---|---|---|---|---|---|---|---|---|---|---|
| 9 | 7 | 33 | 13 | 83 | 4 | 124 | 54 | 17 | 72 | 26 |
| 8 | . | . | . | . | . | . | . | . | . | . |
| 7 | . | . | . | . | . | . | . | . | . | . |
| 6 | . | . | . | . | . | . | . | . | . | . |
| 5 | . | . | . | . | . | . | . | 55 | 88 | . |
| 4 | . | . | . | . | . | . | . | . | . | . |
| 3 | . | . | . | . | . | . | . | . | . | 73 |
| 2 | . | . | . | . | . | . | . | . | . | . |
| 1 | . | . | . | . | . | . | 70 | . | . | . |

FIXED OR SERIAL NUMBER

| Cable No. | 1 | 2 | 3 | 4 | 5 | 6 | 7 | 8 | 9 |
|---|---|---|---|---|---|---|---|---|---|
| Code | 106 | 112 | 121 | 126 | 137 | 146 | 151 | 157 | 164 |

As an example, assume a message (No. 3) is to be sent by bank A to bank B as follows: "Pay 1200 French francs to Mr. X and 353 French francs to Mrs. Y", and assume this message is to be sent on Wednesday, June 15. Then the following coded message can be obtained for transmission from Table 1:

| | | |
|---|---|---|
| Wednesday | = | 27 |
| 15 | = | 130 |
| June | = | 94 |
| 1000 | = | 70 |
| 500 | = | 55 |

| -Continued | | |
|---|---|---|
| 50 | = | 88 |
| 3 | = | 73 |
| French francs | = | 155 |
| No. 3 in sequence | = | 121 |
| Total for test number | = | 813 |

This test number (813) is transmitted with the message sent by bank A to bank B, where, before the instructions are carried out, the genuineness of the message is verified by recalculating the test number from the actual message and the telegraphic cipher-key AB. The message is verified as genuine if the test number is indeed 813. If the figures agree, the message indeed is seen to originate from bank A and the total amount to be paid is indeed seen to be 1553 French francs.

It thus can be appreciated that the authorized official of the bank mentioned whose role is coding and decoding disadvantageously spends a considerable amount of time on operations of this sort where there is a large number of telexed or telegraphed dealings between branches of banks.

SUMMARY OF THE INVENTION

It is therefore an object of the present invention to enable telex or telegraph messages to be exchanged with associates throughout the world, each of whom has a large number of telegraphic cipher-keys which must be scrupulously kept secret.

It is a further object of the present invention to provide an electronic calculator whose purpose is to enable the test number to be deciphered, both when sending and when receiving, in the most automatic way possible, from, for example, programme cards which can be made, checked, corrected or copied using the same machine.

The foregoing and other objects are attained in accordance with one aspect of the present invention through the provision of an electronic calculator for authenticating messages, said calculator including a set of memory codes to provide the message to be transmitted in the form of figures, and a totalizer for the figures in the code. To prevent illicit use by unauthorized persons, provision may be made for one or a plurality of security keys to locks, one key being reserved for writing cards, for example, the other for calculating. The keys may, as is well known, comprise contact-switch or contact keys.

The calculator according to the present invention thus basically enables the following functions to be performed:

1. Writing programme cards

The calculator enables all the information from a telegraphic cipher-key exchanged to be fed manually into a central memory and enables all the data to be transferred from the central memory onto a magnetic programme card by inserting a magnetic card and pressing a "WRITE" key.

2. Checking programme cards

As a result of the programme card being inserted, the data thereon is transmitted to the central memory. The items of data can then be called one by one. Numbers appear on a first illuminated window.

3. Correcting programme cards

It is possible to correct any errors or alter any item of data on the programme card simply by magnetic overprinting, with read-out in said first illuminated window.

4. Copying programme cards

As many copies as necessary can be made from one programme card.

5. Deciphering the test number

Initially the calculator operates as a simple adder to figure out the total amount of money to be checked. On the basis of this total, which appears in a second window, and of the position of the indicator lights, the machine selects items of information on the programme card and provides a total for them (which is the "test number") in the first window.

The present invention also includes a method of making and correcting the cards.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings, in which.

DETAILED DESCRIPTION OF A PREFERRED EMBODIMENT

Figure 1:
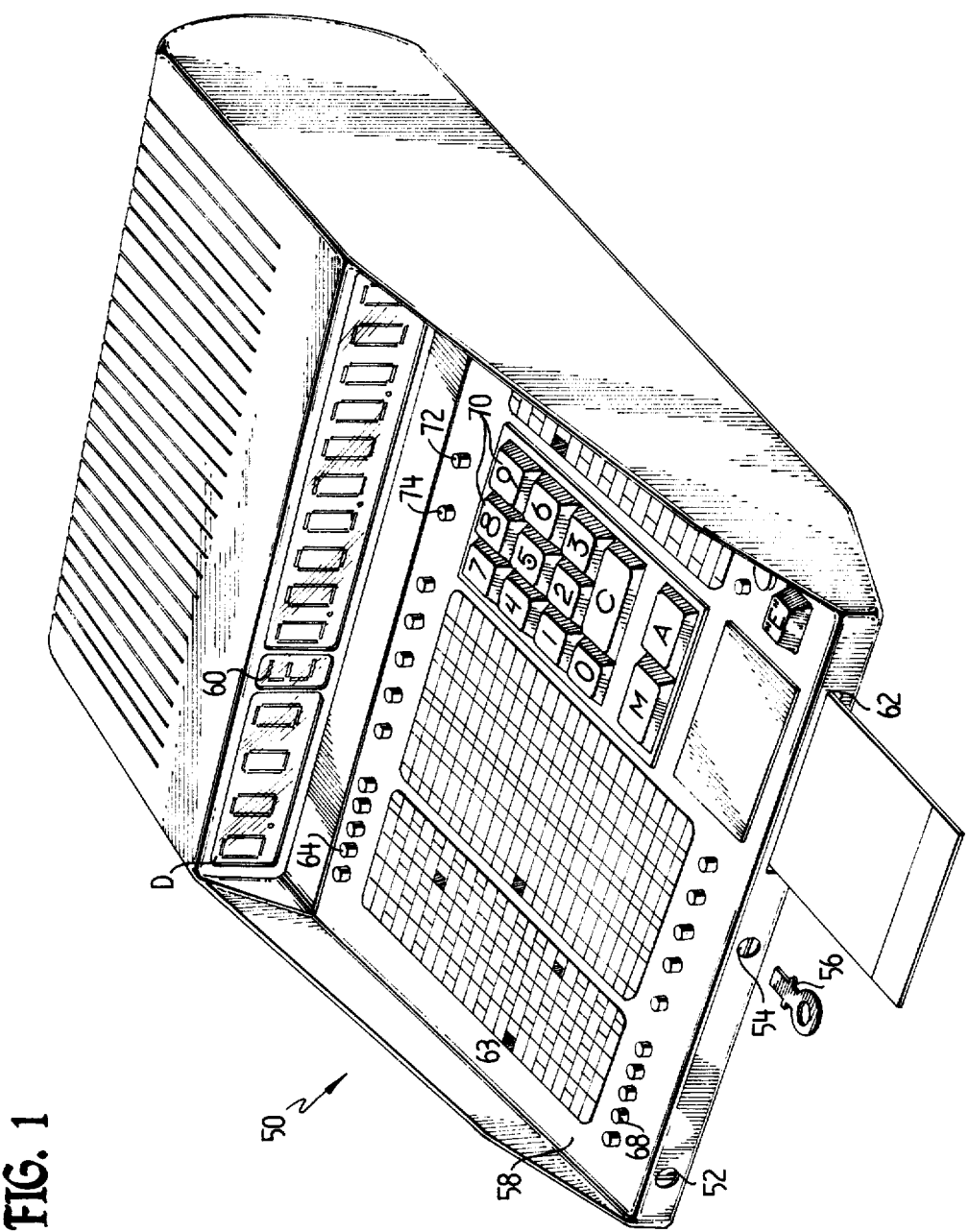
FIG. 1 is a general perspective view of the calculator according to the present invention.

Referring now to the drawings, wherein like reference numerals designate identical or corresponding parts throughout the several views, and more particularly to FIG. 1 thereof, the basic shape of the calculator 50 is seen to be that of a desk-top type containing a certain number of keys and indicator lights, as well as the signs necessary to allow dates, currencies, amounts and the serial numbers to be fed in. In FIG. 1, the lock 52 on the lower left of the front panel is for writing and there are two positions for its key (not shown), either for making cards (E) or for checking their contents (V). With the lock 52 in either of these positions the right-hand lock 54, which is for calculating, is inoperative. When the calculating key 56 of lock 54 is in the "CALCULATE" (C) position, writing and checking cannot take place, and when it is in the "O" position, writing and checking can be switched in.

An indicator light "L" only comes on when the left-hand key is switched to the WRITE mode (E) or when the programme memory is full. Near indicator lamp L there is a button "E" which allows the WRITE mode (E) to be selected. The button will only work when the indicator light L is on, i.e. when the left-hand key is switched to WRITE (E) or when the programme memory is full. Button E lights up when operated and goes off when the writing is completed.

At the upper part of the control board 58 is provided a display D with illuminated digits which comprises four digits on the left and ten digits on the right separated by an error indicator 60. At the front of the control board 58 is a slot 62 which allows a programme card "P" to be inserted in the card-reader. This card P accordingly contains all the codes, for example, in Table 1, i.e. 249 addresses split up into six zones, these electronic addresses being as follows:

| | |
|---|---|
| 7 | for the days of the week |
| 31 | for the dates in the month |
| 12 | for the months in the year |
| 100 | for the currencies |
| 9 | for the serial numbers |
| 90 | for the amounts. |

At the top of the control board 58 are buttons which enable the day of the week, the date in the month, the currencies and the fixed serial numbers to be selected.

At the top of each column of figures or signs is a button 64, which allows a lit pilot lamp 66 to be shifted downwards and at the bottom a corresponding button 68 which allows it to be shifted upwards, which enables the lighted pilot lamps to be positioned opposite each of the desired markings (day, date, month currency and serial number). Amounts are indicated by means of a conventional calculating machine keyboard 70. For these amounts there is a button 72 at the top right which can be used for "one by one" operation and another button 74 at the top-left for high-speed semi-automatic selection. Below each of the signs from the table are pilot lamps which enable them to be located, as described above.

Key "C" makes corrections possible; in the WRITE mode it cancels the illuminated digital display on the left and in the CALCULATE mode it cancels the illuminated numerical displays on the right and left and removes from the totalizer the amounts which were on display.

In the WRITE mode, memory key E is used to feed addresses into the memory and in the CALCULATE mode to feed amounts into the totalizer.

The "A" key (call-up) is used to extract codes from the memory in the WRITE and "CHECK" modes, those numbers which come from the memory appearing on the left-hand numerical display. In the CALCULATE mode it is used to call up the final result of the calculation, and thus the test number, onto the left-hand display.

The principles of operation of the present invention will now be described with reference to the block diagrams of FIGS. 2, 3, and 4, which depict circuit components which are understood to be of any conventional type familiar to one skilled in the art, such components being shown in the diagrams by rectangular blocks.

Within each block is a label which indicates the function of each block. The numbers which appear on the connecting lines of the blocks indicate the transmission of instructions or data as detailed hereinafter.

Figure 2:
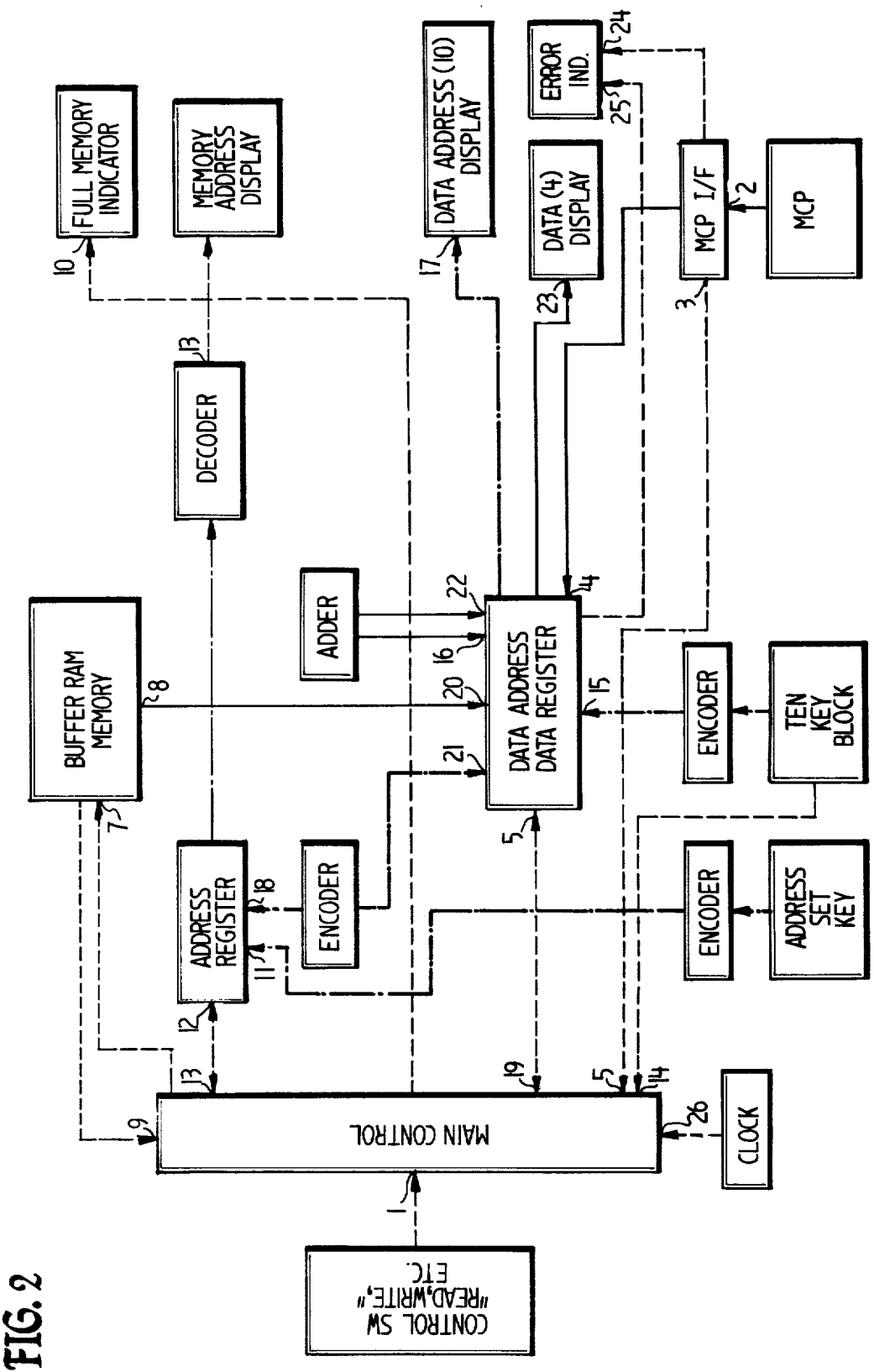
FIG. 2 is a block diagram of the internal circuitry of the calculator of FIG. 1 in a read-out mode according to a preferred embodiment of the present invention.
Figure 3:
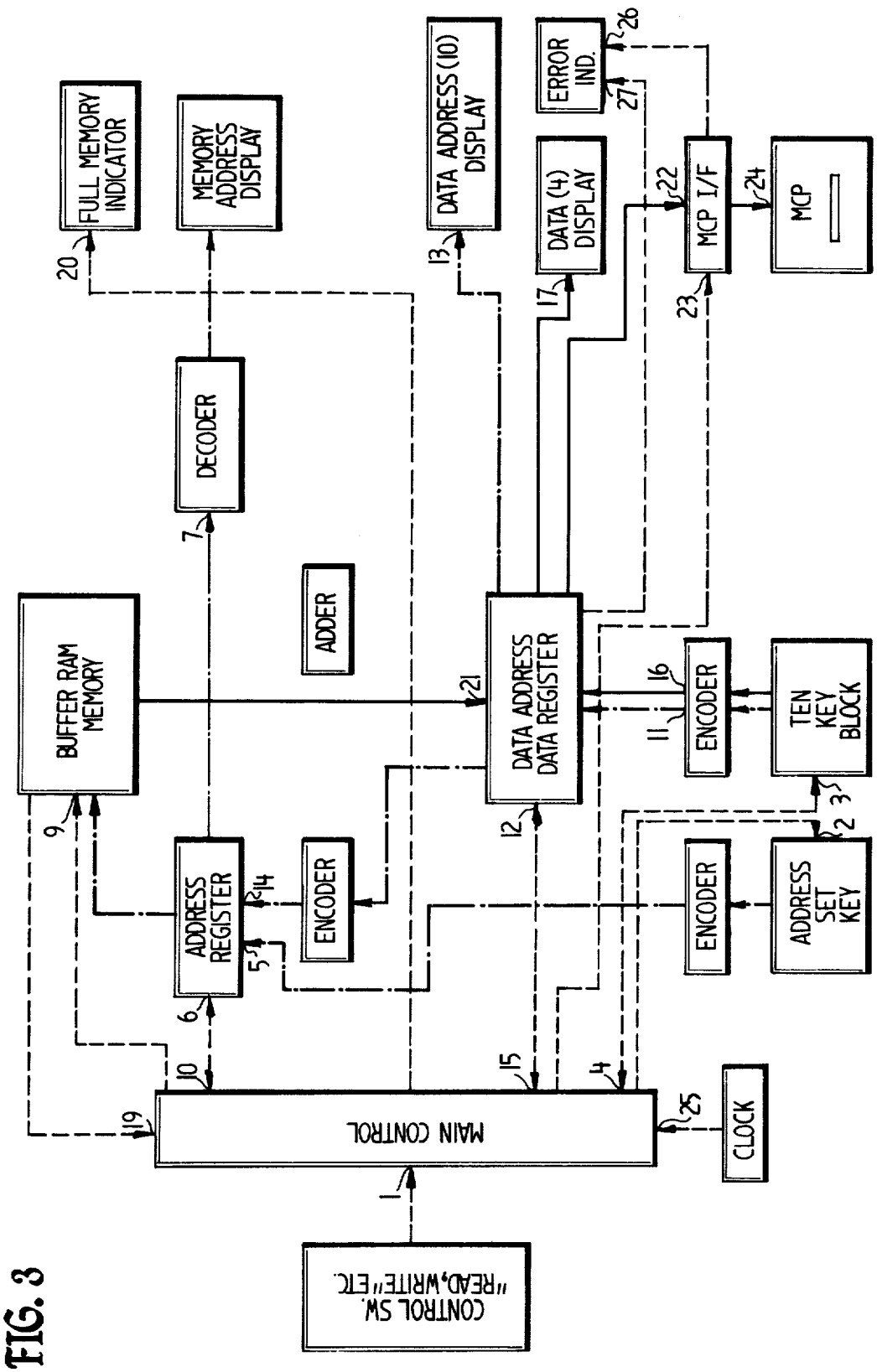
FIG. 3 is a block diagram of the circuitry of the calculator of FIG. 1 in a "WRITE" mode.
Figure 4:
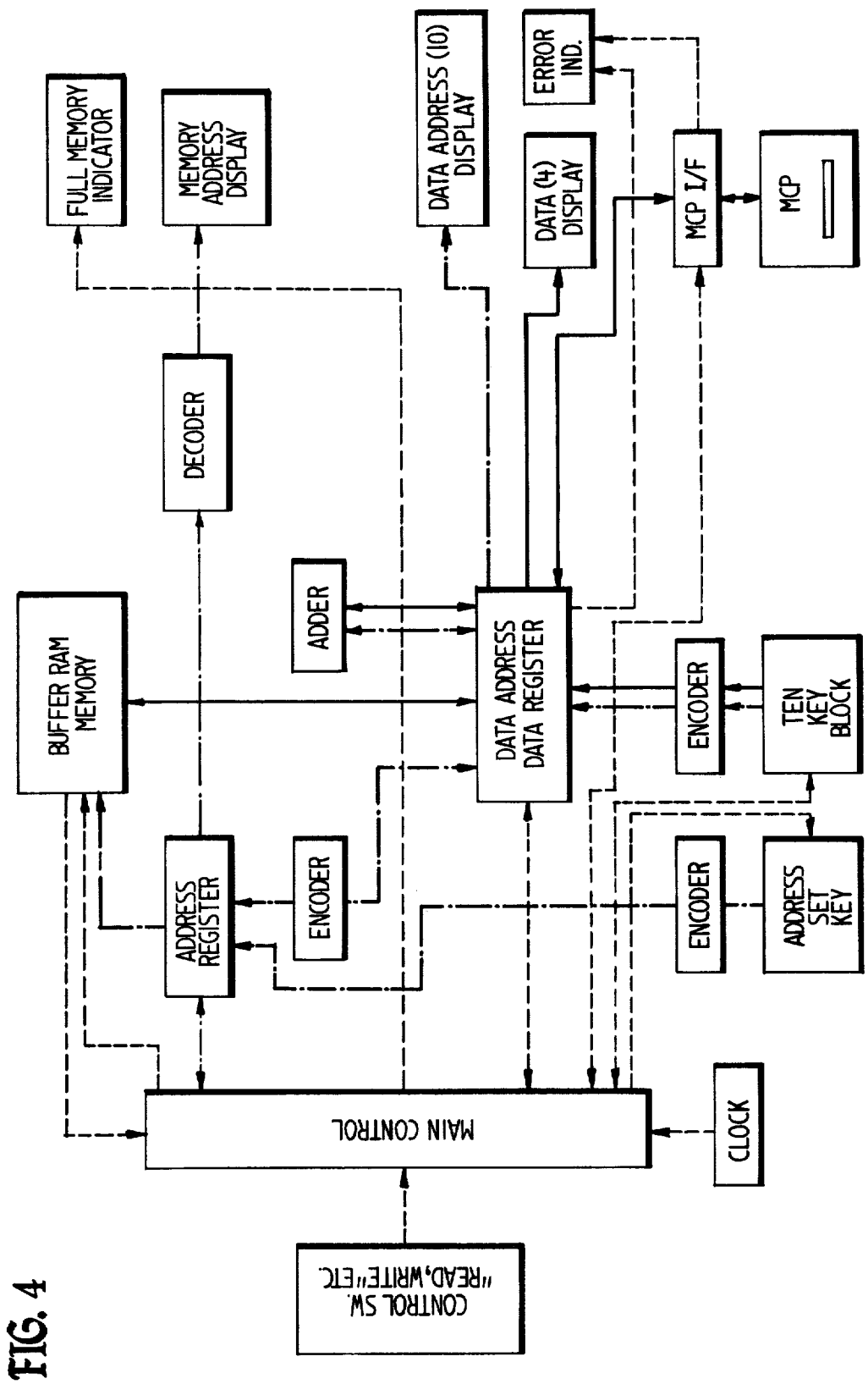
FIG. 4 is an overall block diagram of the circuitry of the calculator of FIG. 1.

In FIG. 3, as well as FIGS. 2 and 4, the connections shown as solid lines represent the transmission of coded data, those in dotted and dashed lines represent address transmissions, and those in broken lines represent control or order transmissions.

I. The WRITE Mode (FIG. 3)

1. It is indicated to the MAIN CONTROL that the WRITE mode has been selected.

2. 3. The MAIN CONTROL instructs the SELECTOR BUTTONS to change to auto-selection, i.e. they jump automatically from one address to another.

4. Instructions from keys C, M, A are transmitted to the MAIN CONTROL.

5. The addresses selected by the SELECTOR BUTTON are transmitted to the ADDRESS REGISTER.

6. The MAIN CONTROL instructs the ADDRESS REGISTER to transmit the address to the MEMORY (operation 8) and to the display (operation 7).

9. The MAIN CONTROL instructs the random access type MEMORY to accept the incoming address.

10. The ADDRESS REGISTER instructs the MAIN CONTROL to transmit the next address after that just transmitted by the ADDRESS REGISTER.

11. The "amount" addresses are transmitted to the CENTRAL REGISTER for data and data addresses.

12. The MAIN CONTROL instructs the DATA ADDRESS AND DATA REGISTER to transmit the address to display (operation 13) and to the ADDRESS REGISTER (operation 14).

15. The CENTRAL REGISTER instructs the MAIN CONTROL to transmit the next address after that transmitted by the CENTRAL REGISTER.

16. The numerical SELECTOR BUTTONS feed data to the CENTRAL REGISTER.

12. (repeat) The MAIN CONTROL instructs the CENTRAL REGISTER to transmit this data to the display (operation 17) and to the MEMORY (operation 18).

15. (repeat) The CENTRAL REGISTER instructs the MAIN CONTROL to transmit the next item after the REGISTER has sent on the data.

19. The MEMORY instructs the MAIN CONTROL to stop if the memory is full.

20. The MAIN CONTROL instructs the indicator to show "MEMORY FULL".

9. (repeat) The MAIN CONTROL instructs the MEMORY to feed addresses and data in store back to the DATA ADDRESS AND DATA REGISTER (operation 21).

12. (repeat) The MAIN CONTROL instructs the DATA ADDRESS AND DATA REGISTER to transmit addresses and information to the interface system associated with the magnetic card printer MCP (operation 22).

22. The MAIN CONTROL instructs the interface device to convert and transmit to the magnetic card unit (operation 24).

25. Operations, and especially operations 21, 22 and 24 are synchronized.

26. Parity check.

27. Overflow indicated.

II. Calculating Mode (FIG. 2)

1. The MAIN CONTROL is informed that the CALCULATE mode has been selected.

2. Information on the card in the magnetic card unit picked up and transmitted to the interface device.

3. MAIN CONTROL instructs the interface device to convert and to transmit the data and data addresses to the DATA AND DATA ADDRESS REGISTER (operation 4).

5. The interface device replies to the MAIN CONTROL: "Operations 3 and 4 carried out".

6. The MAIN CONTROL instructs the DATA AND DATA ADDRESS REGISTER to transmit all its information to the MEMORY.

7. The MAIN CONTROL instructs the MEMORY to accept the data.

8. Data is transmitted from the DATA AND DATA ADDRESS REGISTER to the MEMORY.

9. In the event of its becoming full, the MEMORY transmits to the MAIN CONTROL to cause "MEMORY FULL" to be displayed (operation 10).

11. Addresses selected by the SELECTOR BUTTONS are transmitted to the ADDRESS REGISTER.

12. The MAIN CONTROL instructs the ADDRESS REGISTER to illuminate the display (operation 13).

13b) The ADDRESS REGISTER replies to the MAIN CONTROL "Order carried out".

14. Instructions transmitted to MAIN CONTROL from C, M, A keys.

15. The "Amount " addresses selected are transmitted to CENTRAL REGISTER.

6. (repeat) The MAIN CONTROL instructs the DATA AND DATA ADDRESS REGISTER to transmit the addresses to the totalizer and to display the "Amount"addresses.

16. Amount transmitted back and forth between the totalizer and the ADDRESS REGISTER.

17. Addresses displayed.

18. Same addresses transmitted to the ADDRESS REGISTER.

12. (repeat) MAIN CONTROL instructs ADDRESS REGISTER to receive, interpret and file the addresses.

19. The DATA AND DATA ADDRESS (CENTRAL) REGISTER confirms order carried out to the MAIN CONTROL.

14. (repeat) The ADDRESS REGISTER confirms order carried out to the MAIN CONTROL. Key A operated. .

12. (repeat) The MAIN CONTROL instructs the ADDRESS REGISTER to transmit all its addresses to the CENTRAL REGISTER (operation 21).

19. (repeat) The CENTRAL REGISTER informs the MAIN CONTROL of what it has received.

7. (repeat) The MAIN CONTROL instructs the MEMORY to transmit to the CENTRAL REGISTER the information corresponding to the next addresses (operation 20).

22. This information is transmitted to the totalizer and back.

23. The total is transmitted to the data display.

24. Parity check.

25. Overflow indication.

26. The operations, and especially operations 8, 20, and 21 are synchronized by a clock.

In the foregoing, the terms "amount addresses" were the amounts punched into the keyboard which, in fact, were equivalent to an address for coded figures stored in the MEMORY after being extracted from the magnetic card. All the markings and connections of FIGS. 2 and 3 have been grouped together in FIG. 4 to show the overalll construction of the circuit.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by letters patent of the United States is:

1. An electronic calculator for authenticating messages comprising:
a main control;
a control switch;
a clock;
an address register;
a first encoder;
a second encoder;
an address set key;
a buffer ram memory;
a data address-data register;
third encoder;
a key block;
an adder;
a decoder;
a full memory indicator;
a memory address display;
a data address display;
a data display
an error indicator;
a magnetic card printer interface;
a magnetic card printer;
means connecting the main control to the buffer ram memory for address transmissions from the buffer ram memory to the main control;
means connecting the main control to the buffer ram memory for address transmissions from the main control to the buffer ram memory;
means connecting the main control to the address register for control transmissions between the main control and the address register;
means connecting the main control to the full memory indicator for address transmissions from the main control to the full memory indicator;
means connecting the main control to the data address-data register for address transmissions between the main control and the data address-data register;
means connecting the main control to the magnetic card printer interface for address transmissions between the magnetic card printer interface to the main control;
means connecting the main control to the key block for address transmissions between the main control and the key block;
means connecting the main control to the address set key for address transmissions from the main control to the address set key;
means connecting the main control to the clock for address transmissions from the clock to the main control;
means connecting the main control to the control switch for address transmissions from the control switch to the main control;
means connecting the address register to the buffer ram memory for control transmissions from the address resister to the buffer ram memory;
means connecting the address register to the decoder for control transmissions from the address register to the decoder;
means connecting the address register to the first encoder for control transmissions from the first encoder to the address register;
means connecting the address register to the second encoder for control transmissions from the second encoder to the address register;
means connecting the first encoder to the data address-data register for control transmissions from the first encoder to the data address-data register;
means connecting the second encoder to the address set key for control transmissions from the second encoder to the address set key;

means connecting the buffer ram memory to the data address-data register for data transmissions between the buffer ram memory and the data address-data register;

means connecting the data address-data register to the third encoder for control transmissions from the third encoder to the data address-data register;

means connecting the third encoder to the data address-data register for data transmissions between the third encoder and the data address-data register;

means connecting the third encoder to the key block for control transmissions from the key block to the third encoder;

means connecting the third encoder to the key block for data transmissions from the key block to the third encoder;

means connecting the adder to the data address-data register for control transmissions between the adder and the data address-data register;

means connecting the adder to the data address-data register for data transmissions between the adder and the data address-data register;

means connecting the data address-data register to the data address display for control transmissions from the data address-data register to the data address display;

means connecting the data address-data register to the data display for data transmissions from the data address-data register to the data display;

means connecting the data address-data register to the magnetic card printer interface for data transmissions between the data address-data register and the magnetic card printer interface;

means connecting the data address-data register to the error indicator for address transmissions from the data address-data register to the error indicator;

means connecting the decoder to the memory address display for control transmissions from the decoder to the memory address display;

means connecting the magnetic card printer interface to the error indicator for address transmissions from the magnetic card printer interface to the error indicator; and means connecting the magnetic card printer interface to the magnetic card printer.

* * * * *